(12) United States Patent
Scott

(10) Patent No.: US 11,919,665 B2
(45) Date of Patent: Mar. 5, 2024

(54) UNMANNED AERIAL VEHICLES WITH CARGO PODS PROVIDING SUPPLEMENTAL POWER AND DOCKING STATIONS FOR RECHARGING THE CARGO PODS

(71) Applicant: TB2 Aerospace, Breckenridge, CO (US)

(72) Inventor: Frank M. Scott, Breckenridge, CO (US)

(73) Assignee: TB2 Aerospace, Breckenridge, CO (US)

( * ) Notice: Subject to any disclaimer, the term of this patent is extended or adjusted under 35 U.S.C. 154(b) by 146 days.

(21) Appl. No.: 17/533,034

(22) Filed: Nov. 22, 2021

(65) Prior Publication Data

US 2022/0161928 A1    May 26, 2022

Related U.S. Application Data

(60) Provisional application No. 63/186,744, filed on May 10, 2021, provisional application No. 63/165,570, filed on Mar. 24, 2021, provisional application No. 63/205,154, filed on Nov. 20, 2020.

(51) Int. Cl.
| | |
|---|---|
| *B64U 50/34* | (2023.01) |
| *B64U 50/39* | (2023.01) |
| *B64C 39/02* | (2023.01) |
| *B64U 50/19* | (2023.01) |
| *B64U 101/64* | (2023.01) |

(52) U.S. Cl.
CPC ............. *B64U 50/34* (2023.01); *B64U 50/39* (2023.01); *B64C 39/024* (2013.01); *B64U 50/19* (2023.01); *B64U 2101/64* (2023.01); *B64U 2201/10* (2023.01)

(58) Field of Classification Search
CPC ..... B64U 50/39; B64U 50/34; B64U 2101/64
See application file for complete search history.

(56) References Cited

U.S. PATENT DOCUMENTS

| | | | | |
|---|---|---|---|---|
| 9,928,749 | B2* | 3/2018 | Gil | B64D 1/22 |
| 9,957,045 | B1* | 5/2018 | Daly | G05D 1/0027 |
| 10,457,421 | B2* | 10/2019 | O'Toole | B60L 53/80 |
| 11,597,291 | B1* | 3/2023 | Bikumala | H02J 7/342 |

(Continued)

*Primary Examiner* — Jessica B Wong
(74) *Attorney, Agent, or Firm* — James A. Sheridan; Sheridan Law, LLC

(57) ABSTRACT

There is disclosed a system for enhanced aerial delivery capability. In an embodiment, there is provided a system for enhanced aerial delivery capability. The system includes a UAV having a primary battery to provide power to one or more electrical motors for powered flight. The system includes a pod having a cargo portion to selectively carry a payload, the pod having a supplemental battery to selectively supply power to the UAV. The system includes an autonomous mounting system configured to provide selective and autonomous mechanical connection of the pod with the UAV. The mounting system is configured to provide selective and autonomous electrical connection of the supplemental battery of the pod to the UAV. This configuration selectively powers the one or more electrical motors of the UAV with the stored electrical power from the supplemental battery. Other embodiments are also disclosed.

14 Claims, 8 Drawing Sheets

(56) References Cited

U.S. PATENT DOCUMENTS

| | | | |
|---|---|---|---|
| 2016/0031564 A1* | 2/2016 | Yates | B64D 3/00 |
| | | | 307/9.1 |
| 2016/0244187 A1* | 8/2016 | Byers | B64F 1/04 |
| 2017/0072812 A1* | 3/2017 | Von Novak | B60L 53/20 |
| 2017/0349039 A1* | 12/2017 | Rayner | B62K 27/14 |
| 2018/0044000 A1* | 2/2018 | Venturelli | B60L 53/12 |
| 2018/0089622 A1* | 3/2018 | Burch, V | B64U 50/19 |
| 2018/0231971 A1* | 8/2018 | Greenberger | G08G 5/0069 |
| 2018/0374034 A1* | 12/2018 | Dreano, Jr. | G06Q 10/083 |
| 2019/0039731 A1* | 2/2019 | Marcath | B64F 1/007 |
| 2019/0047462 A1* | 2/2019 | Vijayaraghavan | B64C 39/024 |
| 2020/0242548 A1* | 7/2020 | Curry | G07C 9/00896 |
| 2020/0288895 A1* | 9/2020 | Bennet | H04W 12/08 |
| 2021/0053677 A1* | 2/2021 | Passley | B64U 10/13 |
| 2021/0309353 A1* | 10/2021 | Gil | B64U 30/14 |
| 2021/0380019 A1* | 12/2021 | Livingston | B60L 58/12 |
| 2022/0026926 A1* | 1/2022 | Polega | G06Q 10/0832 |
| 2022/0055770 A1* | 2/2022 | O'Toole | G06Q 10/0832 |
| 2022/0129826 A1* | 4/2022 | Rakshit | G06Q 10/20 |
| 2022/0161928 A1* | 5/2022 | Scott | B64C 39/024 |
| 2022/0258632 A1* | 8/2022 | Ehrenhalt | B60L 53/14 |
| 2022/0274493 A1* | 9/2022 | Dunn | B64U 50/34 |
| 2023/0086129 A1* | 3/2023 | Pagliccia | B64D 27/24 |
| | | | 244/17.23 |

* cited by examiner

UAV
AUTONOMUS MOUNTING SYSTEM
POD

UAV
AUTONOMUS MOUNTING SYSTEM
POD
DOCKING STATION

UNMANNED AERIAL VEHICLES WITH CARGO PODS PROVIDING SUPPLEMENTAL POWER AND DOCKING STATIONS FOR RECHARGING THE CARGO PODS

REFERENCE TO PENDING PRIOR PATENT APPLICATION

This application claims the benefit under 35 U.S.C. 119 (e) of (1) U.S. Provisional Patent Application No. 63/205,154, filed Nov. 20, 2020 by Frank Scott for "PROCESS FOR OPTIMIZED UNMANNED FLYING ORB/CARGO POD SYSTEM LAUNCH, FLIGHT AND RECOVERY OPERATIONS"; (2) U.S. Provisional Patent Application No. 63/165,570, filed Mar. 24, 2021 by Frank Matthew Scott for "INTERNALLY-POWERED, RECONFIGURABLE, LIFTING-BODY UNMANNED AERIAL SYSTEM POD SYSTEM"; and (3) U.S. Provisional Patent Application No. 63/186,744, filed May 10, 2021 by Frank Scott for "PROCESS FOR MAXIMIZING RANGE OF UNMANNED FLYING VEHICLES UTILIZING A ORB/CARGO POD SYSTEM LAUNCH AND DOCKING STATION";

The above-identified patent applications are hereby incorporated herein by reference.

BACKGROUND

Generally, unmanned aerial vehicles (UAVs) or unmanned aerial systems (UAS) may be used for delivering merchandise, supplies, or other materials from one location to another. In many typical arrangements, the UAV must be configured with a payload and supplies for both travel to a delivery site and return to the initial launch site. This creates logistical issues for sizing and loading of the UAV, which in turn, may create unnecessary delay or expense for the entity using the UAV for delivery of a payload of merchandise, supplies or other materials. Larger batteries and larger UAS are one way that logistical concerns are met, however, this requires significant costs both in terms of financial cost and long-term environmental costs.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a system for enhanced aerial delivery capability. The system includes a UAV having a primary battery to provide power to one or more electrical motors for powered flight. The system includes a pod having a cargo portion to selectively carry a payload, the pod having a supplemental battery to selectively supply power to the UAV. The system includes an autonomous mounting system configured to provide selective and autonomous mechanical connection of the pod with the UAV. The mounting system is configured to provide selective and autonomous electrical connection of the supplemental battery of the pod to the UAV. This configuration selectively powers the one or more electrical motors of the UAV with the stored electrical power from the supplemental battery when the mounting system mechanically and electrically connects the UAV and the pod to one another.

In another embodiment, there is provided a method of powering a UAV for enhanced aerial delivery capability. The method includes providing a UAV having a primary battery to provide power to one or more electrical motors for powered flight. The method includes providing a pod having a cargo portion to selectively carry a payload, the pod having a supplemental battery to selectively supply power to the UAV. The method includes providing an autonomous mounting system configured to provide selective and autonomous mechanical connection of the pod with the UAV. The mounting system is configured to provide selective and autonomous electrical connection of the supplemental battery of the pod to the UAV so as to selectively power the one or more electrical motors of the UAV with the stored electrical power from the supplemental battery when the mounting system mechanically and electrically connects the UAV and the pod to one another. The method includes autonomously mounting the UAV to a selected one from a plurality of pods. The method includes flying the UAV from a first location to a second location using power supplied from the supplemental battery to the UAV. The supplemental battery provides an enhanced range of flight for the UAV in addition to the primary battery.

In yet another embodiment, there is provided a pod configured to removably carry cargo therein. The pod includes a housing structure having an interior portion and an exterior portion, the interior portion conjured to receive the cargo removably carried in the pod, and the exterior portion configured to removably attach to a UAV. The pod includes a pod battery carried by the housing structure. The pod battery providing a supplemental power source separate from a UAV battery carried by the UAV when the housing is detached from the UAV. The pod includes an electrical connection from the pod battery to an electrical input of the UAV, the electrical connection configured to provide electrical power from the pod battery to the UAV when the housing is removably attached to the UAV as the supplemental power source to the UAV battery.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Figure 1:
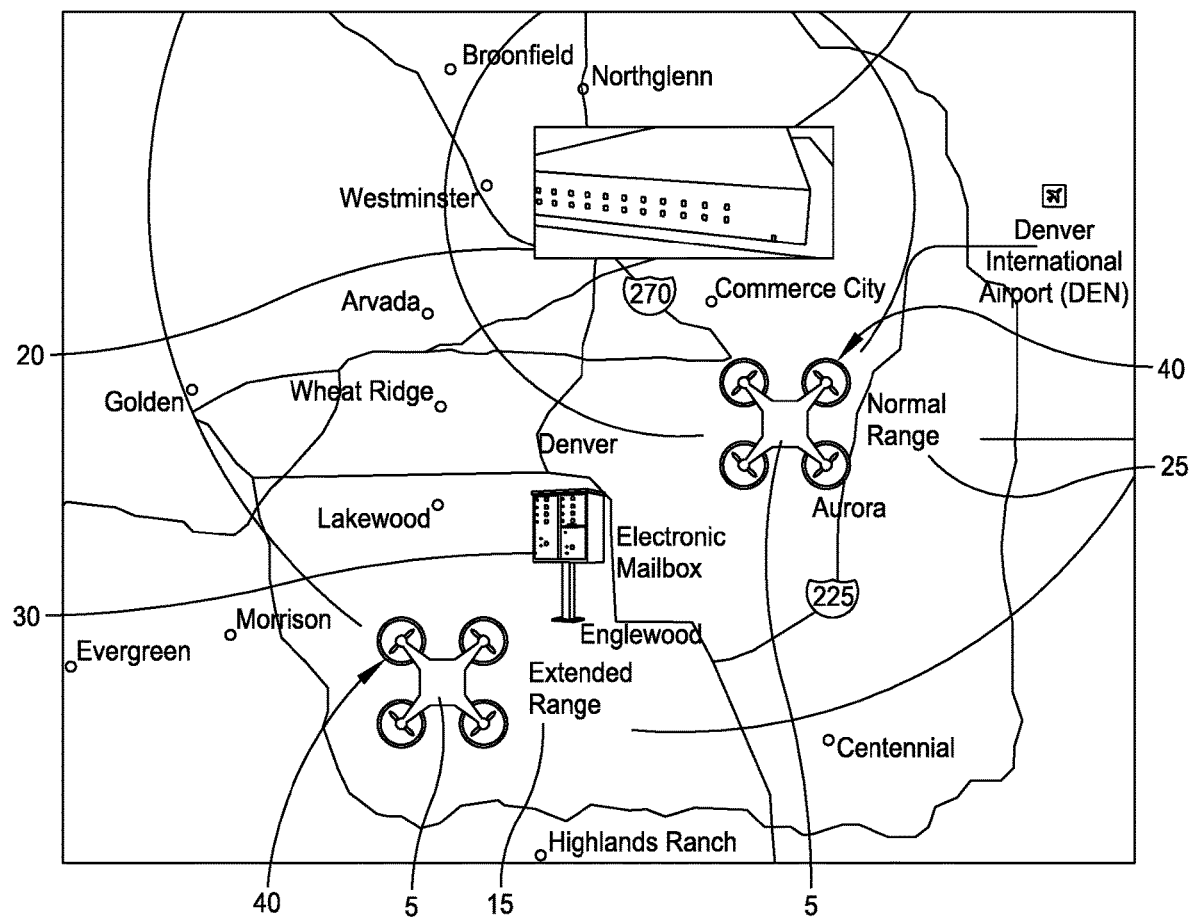
FIG. 1 illustrates a schematic view of a first UAV having a normal range without supplemental power from a pod, and a second UAV having an extended range from the use of supplemental power from a pod.
Figure 2:
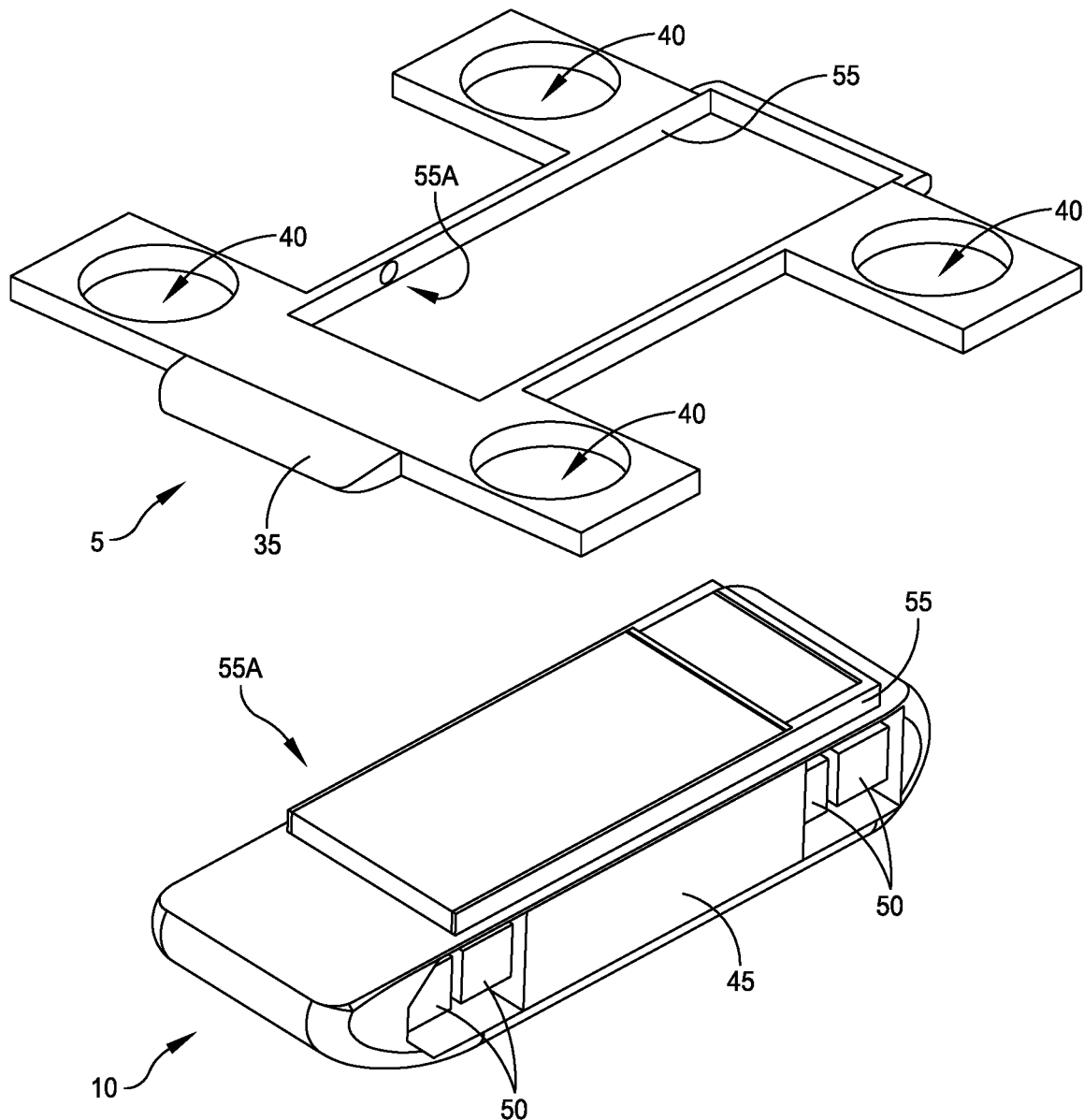
FIG. 2 illustrates a UAS formed by a UAV, an autonomous mounting system, and a pod.

In an embodiment, there is provided a system for enhanced aerial delivery capability. With general reference to FIGS. 1 and 2, extended delivery ranges are available by using various systems, apparatus, and methods in connection with UAVs and separate pod delivery devices. For example, a UAV 5 returning from a delivery of a pod 10 (FIG. 2) (i.e., dropping off pod 10 at one location 15 from a central distribution warehouse 20, may return to central location 20 with a fully charged, empty POD, which will extend the range of delivery drone 5 (i.e., UAV 5) beyond the area of a normal range 25. Delivery may be made to an electronic mailbox 30.

The system includes UAV 5 may have at least one primary battery 35 to provide power to one or more electrical motors 40 for powered flight. The system includes pod 10 having a cargo portion 45 to selectively carry a payload. Pod 10 has at least one supplemental battery 50 to selectively supply power to UAV 5. The system includes an autonomous mounting system 55 configured to provide selective and autonomous mechanical connection of pod 10 with UAV 5. Mounting system 55 may be configured to provide selective and autonomous electrical connection 55A of supplemental battery 50 of pod 10 to UAV 5. This configuration selectively powers one or more electrical motors 40 of the UAV with the stored electrical power from supplemental battery 50 when mounting system 55 mechanically and electrically connects UAV 5 and pod 10 to one another. Electrical connection 55A may include direct connection including, but not limited to, spring pins or other electrical interfaces to hardwired pathways. Electrical connection 55A may also include other electrical pathways, including inductive charging or other charging apparatus and methods.

Pod 10 provides a massive reduction of delivery packaging. Pod 10 may be rugged, lockable, and a reusable delivery vessel in contrast to cardboard boxes or other traditional packaging supplies.

In various embodiments, supplemental battery 50 of pod 10 is configured to provide power to primary battery 35 of UAV 5. In at least one embodiment, supplemental battery 50 of pod 10 may be configured to provide power directly to the one or more electrical motors 40.

Figure 3:
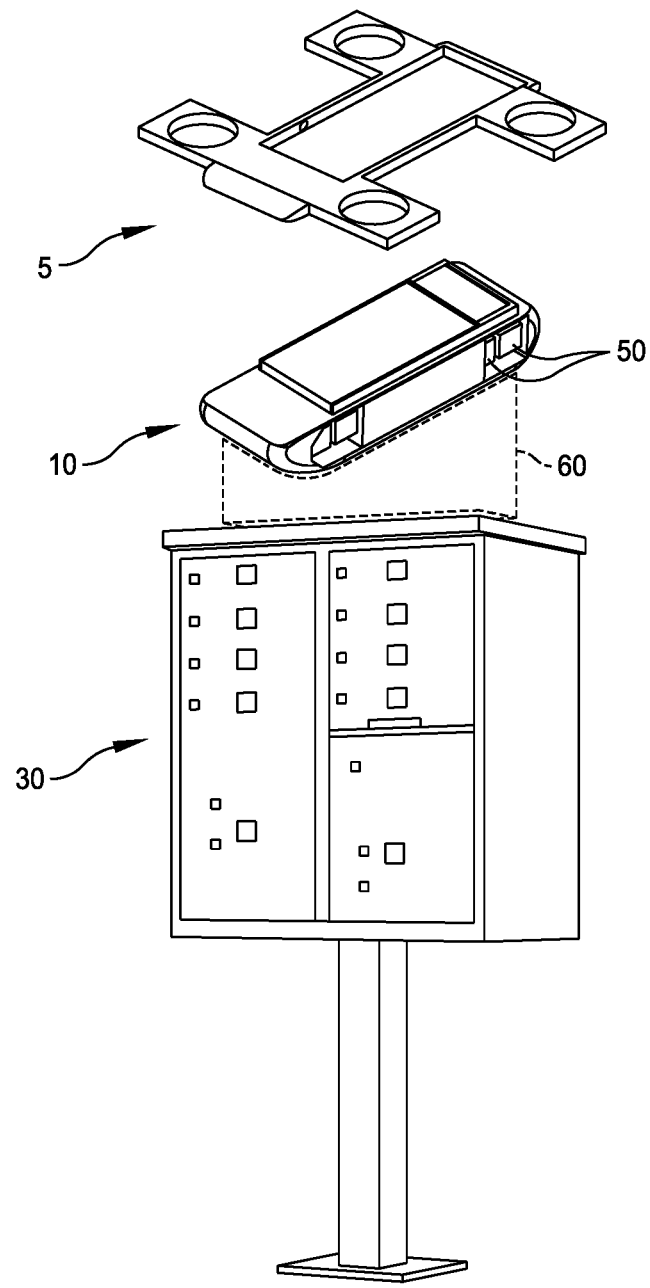
FIG. 3 illustrates the UAS with the pod disposed at a docking station.
Figure 4:
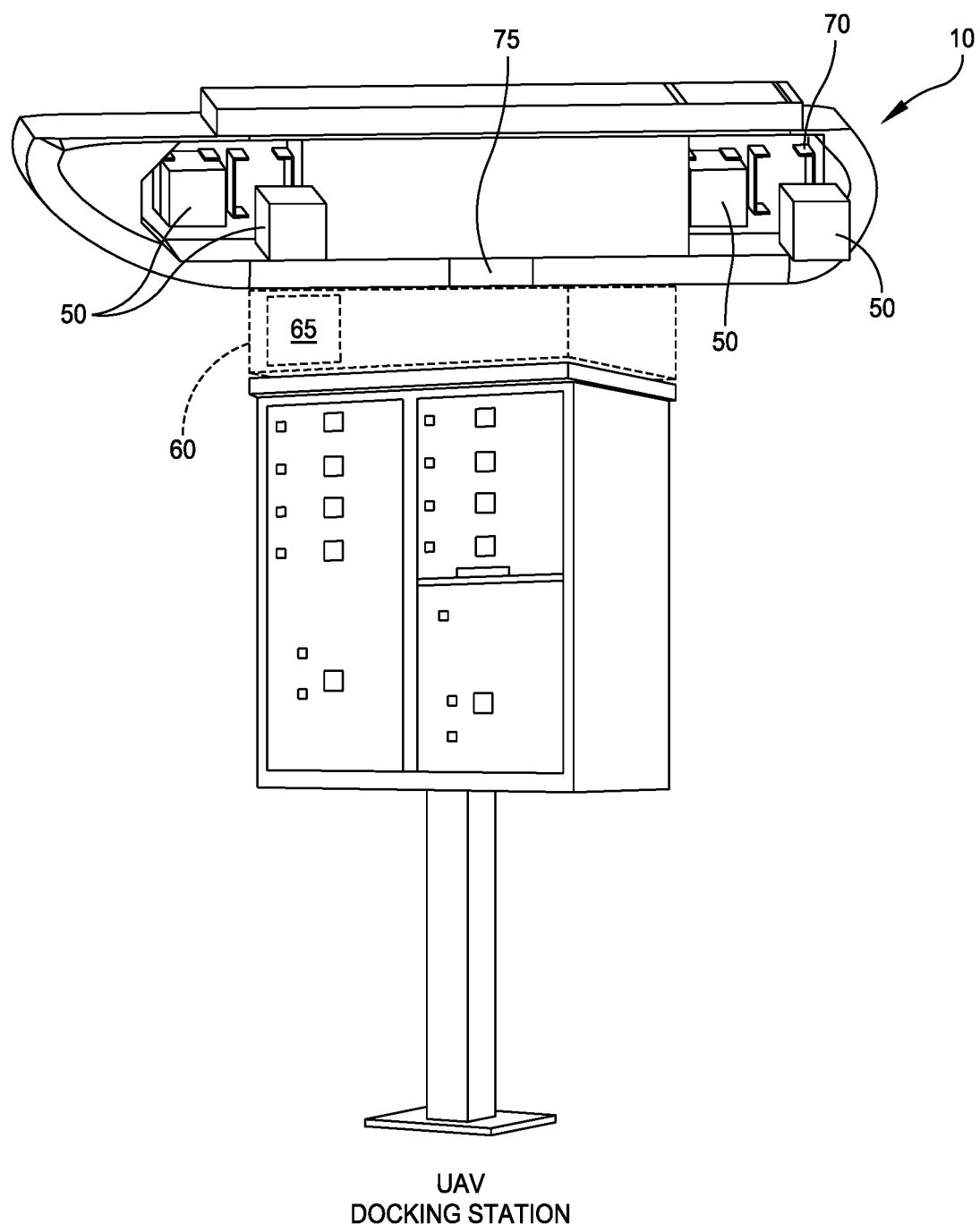
FIG. 4 illustrates the pod disposed at the docking station.
Figure 5:
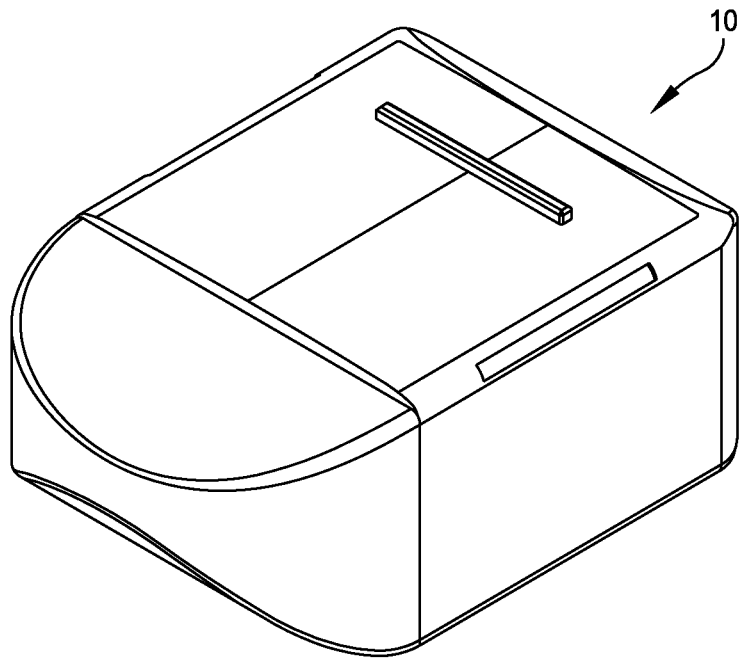
FIGS. 5 and 6 illustrate a pod in an open configuration (FIG. 5) and a closed configuration (FIG. 6).
Figure 6:
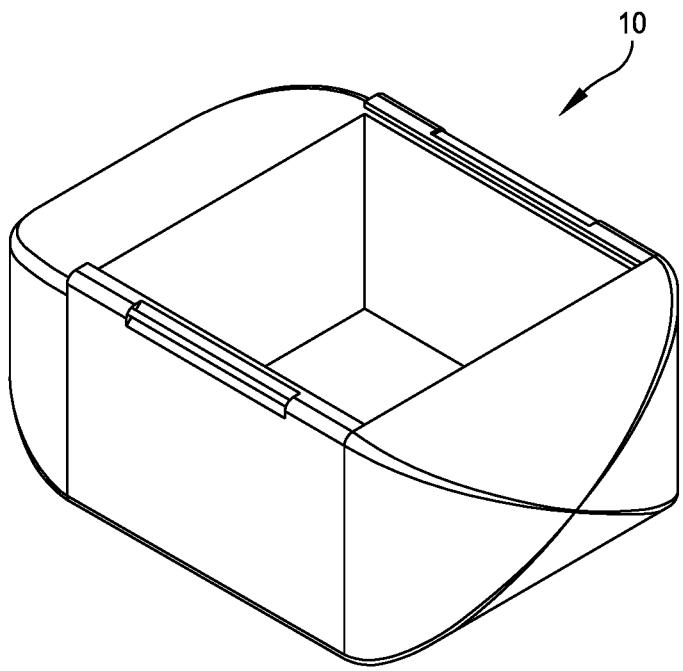

With reference now to FIGS. 3 and 4, further comprising an autonomous docking system 60 configured to provide selective and autonomous mechanical connection of pod 10. Autonomous docking station 60 may be configured to provide selective and autonomous electrical connection to supplemental battery 50 of UAV 5. In various embodiments, a network of electronic mailbox sites 30 may be provided for delivery of pod 10 to a location at or nearby a customer. While waiting for customer to gather the delivery from pod 10, docking station 60 at electronic mailbox site 30 may recharge pod 10. This battery recharge of the pod, in turn, may power UAV 10 during a return flight to a central location (e.g., warehouse 20 of FIG. 1). Electronic mailbox sites 30 with docking system 60 act as a fueling station for UAVs 5, which effectively increase the range of any UAV in connection with a pod.

Selective and autonomous mechanical connection of the pod secures pod 10 to autonomous docketing system 60. This configuration prevents removal of pod 10 by an unauthorized party. Selective and autonomous electrical connection of pod 10 provides electrical power to supplemental battery 50 during an absence of UAV 5. Docking station 60 may include a battery status monitor 65 in electrical connection with supplemental battery 50. Battery status monitor 65 may be configured to broadcast information related to supplemental battery 50 to a base station or other central control center.

In various embodiments, UAV 5 may be selectable from a plurality of UAVs. Pod 10 may be selectable from a plurality of pods. With various mounting capabilities, UAVs and pods may be swapped with one another by selecting one from the plurality of UAVs to autonomously mount to a selected one from the plurality of pods. In an embodiment, autonomously mounting allows UAV 5 to retrieve pod 10 without human interaction at the pick-up site. Similarly, autonomous delivery allows UAV 5 to decouple from pod 10 without human interaction at the delivery site. In various embodiments, a selected one of the plurality of UAVs may be configured to autonomously decouple from a selected one of the plurality of pods. So as to provide a more efficient delivery and retrieval system, UAVs may be configured to autonomously mount to a different selected one from the plurality of pods. This allows a swap of UAV 5 to from a selected one of the plurality of pods to the different selected one from the plurality of pods. For example, a standardized pod may be provided which is able to mate with various styles of UAVs or other flight vehicles.

In various embodiments, docking station 60 may include a battery status monitor 70 in electrical connection with supplemental battery 50. Battery status monitor 70 may be configured to broadcast information related to supplemental battery 50 to a base station or other central control center. Pod 10 may include a location status monitor 75 to determine location. Location status monitor 75 may be configured to broadcast information related to the location of pod 10 to a base station or other central control center.

In various embodiments, a cargo monitor 75 may be provided to determine status of the payload in cargo portion 45 of pod 10. Cargo monitor 75 may be configured to broadcast information related to the status of the payload in the cargo portion to a base station or other central control center.

In another embodiment, there is provided a method of powering a UAV for enhanced aerial delivery capability. The method may include providing a UAV having a primary battery to provide power to one or more electrical motors for powered flight. The method may include providing a pod having a cargo portion to selectively carry a payload. The pod has a supplemental battery to selectively supply power to the UAV. The method may include providing an autonomous mounting system configured to provide selective and autonomous mechanical connection of the pod with the UAV. The mounting system may be configured to provide selective and autonomous electrical connection of the supplemental battery of the pod to the UAV. This may allow the pod to selectively power the one or more electrical motors of the UAV with the stored electrical power from the supplemental battery when the mounting system mechanically and electrically connects the UAV and the pod to one another. The method may include autonomously mounting the UAV to a selected one from a plurality of pods. The method includes flying the UAV from a first location to a second location using power supplied from the supplemental battery to the UAV. The supplemental battery provides an enhanced range of flight for the UAV in addition to the primary battery.

In various embodiments, the methods may include autonomously decoupling one of the pods from the UAV. The methods may further include flying the UAV from the second location using the primary battery. The methods may also include autonomously mounting the UAV to another pod selected from a number of pods. This may include swapping the UAV from one of the pods to another one of the pods. The methods may include flying the UAV using the supplemental battery of the swapped pod. This provides a fully charged (or at least more fully-charged) supplemental battery of the swapped pod. In various embodiments, these swapping methods provides an enhanced range of flight for the UAV in addition to the primary battery.

In yet another embodiment, there is provided a pod configured to removably carry cargo therein. The pod includes a housing structure having an interior portion and an exterior portion, the interior portion conjured to receive the cargo removably carried in the pod, and the exterior portion configured to removably attach to a UAV. The pod includes a pod battery carried by the housing structure. The pod battery providing a supplemental power source separate from a UAV battery carried by the UAV when the housing is detached from the UAV. The pod includes an electrical connection from the pod battery to an electrical input of the UAV, the electrical connection configured to provide electrical power from the pod battery to the UAV when the housing is removably attached to the UAV as the supplemental power source to the UAV battery.

In various embodiments, the electrical connection from the pod battery to the electrical input of the UAV is configured to provide power to the UAV battery. In at least one embodiment, the electrical connection from the pod battery to the electrical input of the UAV is configured to provide power directly to one or more electrical motors of the UAV.

In various embodiments, a UAV's range may be increased by offering a swappable power source (in pod 10) at some point between its home base and its customers delivery location. The combination of a swappable pod 10, a docking system that can recharge the pod 10, and the ability for any returning UAV to collect that fully charged pod 10 that has completed the process may be configured to provide UAV 5 with an increased effective flight range 15. Pod 5 and remote docking system 60 effectively act as a gas station for a UAV returning to its home base 20.

The design of UAV 5 may be at the discretion of the operator of the manufacturer but it would have to be designed to mate with the POD. This process merely seeks to offer a method whereby a standardized POD, with a standard POD-power source, standardized attachment/mounting system and on-ground recharging system works in concert with a UAV.

Various processes may be provided to operate pod 10 in concert with a non-specific flying unit (i.e., UAV 5). Pod 10 is designed to be attached to a wide variety of unmanned aerial systems (drones, UAVs, etc.). This process affords a universal pod 10 that UAV 5 may be attached to for a wide variety of operations.

In various embodiments, a standardized group of pods 10 may be provided for use with one or more types of UAVs 5. In other words, any form of EVTOL aircraft/UAV can be designed to mate with the pod, and may be configured to utilize the supplemental electrical power provided by the pod.

Operational process may involve the UAV landing on the pod and attaching the UAV and pod to one another for flight. The UAV may vertically land on top of the pod or dock together in another configuration with one another. The UAV typically contains all flight related equipment, propulsion, flight controls, avionics and safety systems. The UAV operates with its own internal power (i.e., the primary battery) to fly or hover under its own power from one pod to a next pod. When in attachment to a pod, the UAV may utilize the supplemental battery power from the pod. This utilization may be implemented to directly power the electric motors of the UAV, to recharge the battery of the UVA, to power other systems of the UAV, or the supplemental battery may be used only for some part or none of the flight when the UAV and the pod remain coupled with one another.

Once the entire UAV system (pod together with UAV) delivers the pod to a remote docking station/electronic mailbox, the docked POD may remain locked on the dock until its cargo is removed by the intended customer (using a web app with Bluetooth interaction, a manual key pad, or other type of a combination or secret key code shared to the intended customer). During this docking time, the internal power source of the pod may be recharged by the docking station. The UAV may fly on its own internal reserve power (which is smaller in size than the combination of the pod battery in combination with the UAV reserve power source) to the next POD that is charged and loaded for the mission. This POD may be directly adjacent to the delivered pod or it could be several miles away on another dock, with its cargo removed by the customer and its internal power charged and ready to supplement the UAV's power.

The pod may supplement the UAV's reserve power once are mated with one another. The flying unit may utilize any variety of propulsion systems based on payload weight, airspeed and other parameters of the mission it is designed for. The pod may carry a variety of mission specific cargo and would come in several standard sizes. The cargo may be merchandise for a customer. The cargo may be supplies for a military operation. The cargo may include, for example, but not limited to, bullets or other weaponry, blood or other medical supplies, and artificial intelligence, including systems needed in the field.

In various embodiments, the docking station may include various configurations of a charging mat/docking system 60 (see, for example, FIG. 8) that serves to recharge the pod's internal power source and also allow for the pod to be reloaded for mission specific payload such as ammunition, water for firefighting, personnel or packages.

Figure 7:
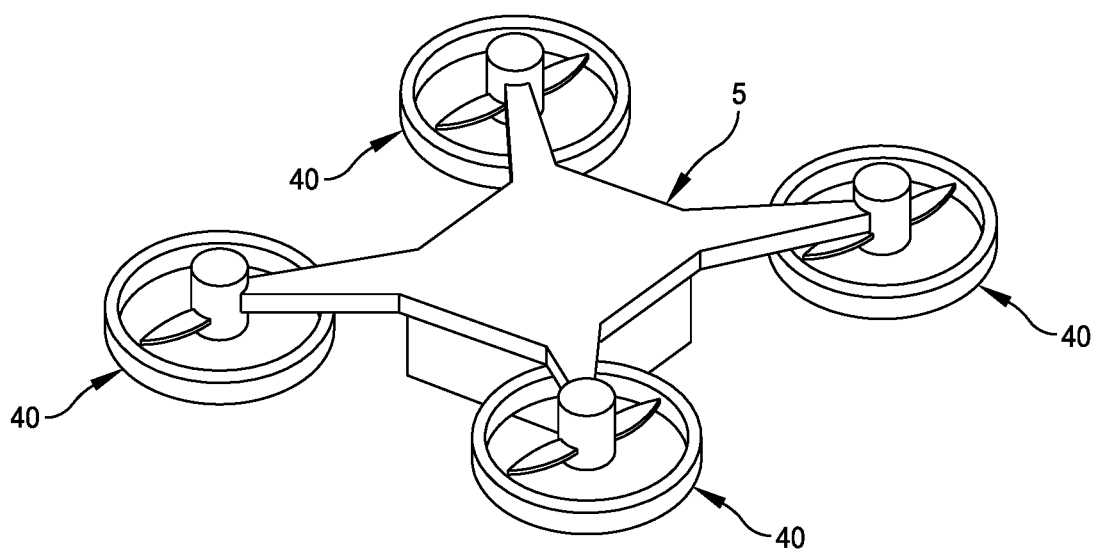
FIG. 7 illustrates a UAV separate from a pod.
Figure 8:
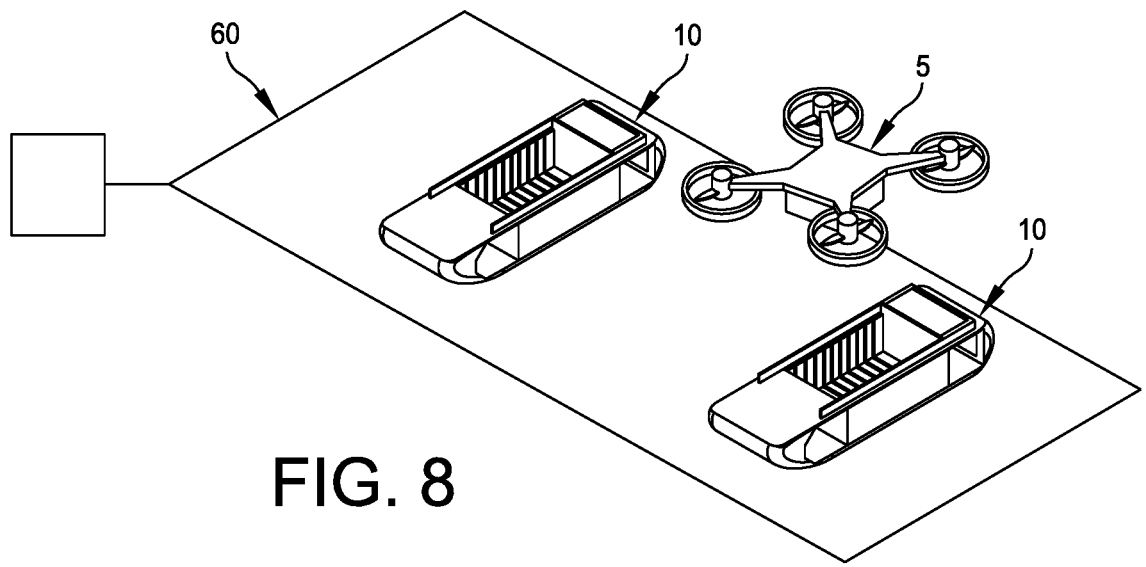
FIG. 8 illustrates a UAV approaching a charging dock with two pods thereon.
Figure 9:
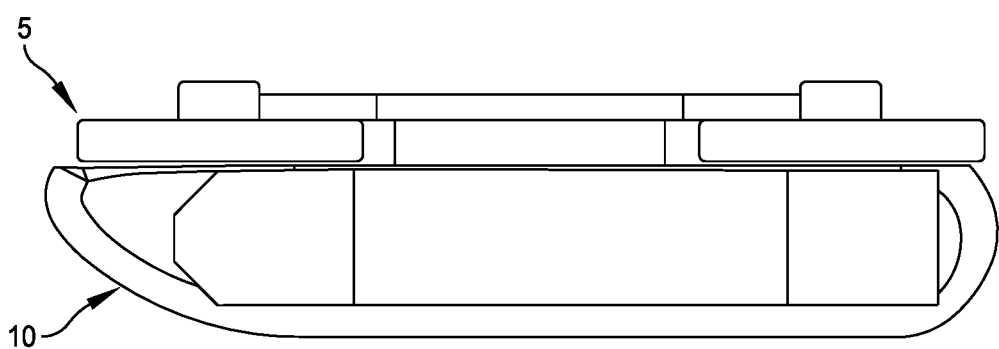
FIG. 9 illustrates the UAV of FIG. 8 together with one of the pods in connection with one another.
Figure 10:
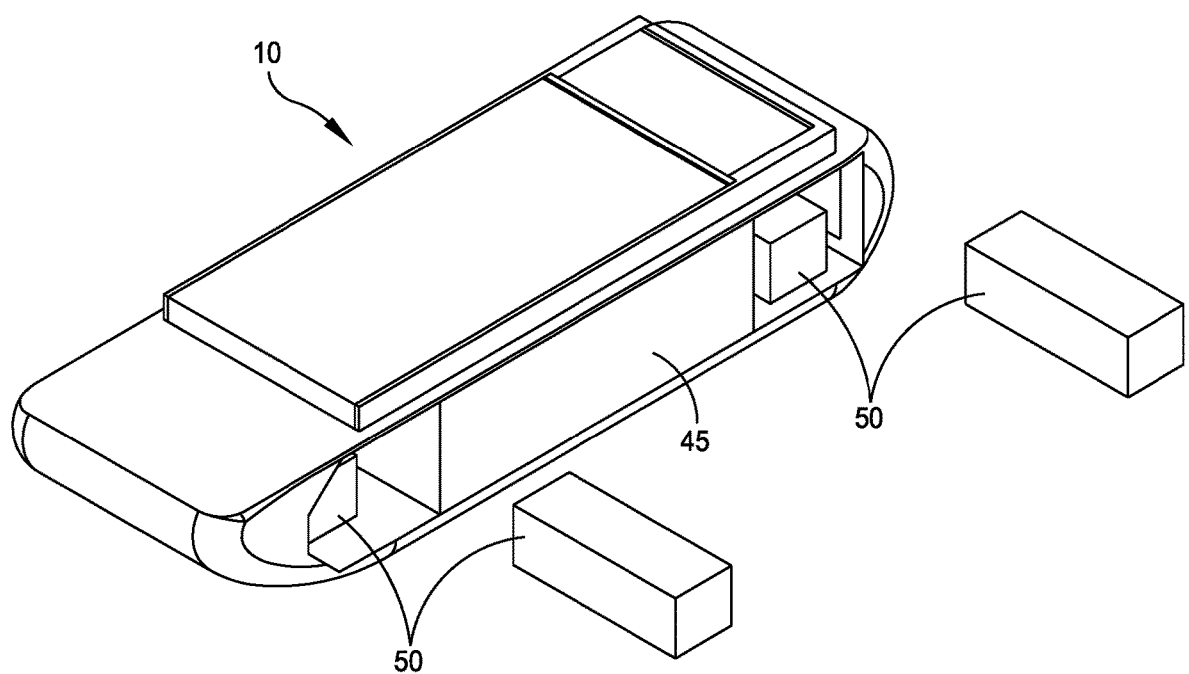
FIG. 10 illustrates a pod with supplemental power batteries.

In multiple embodiments, with reference to FIGS. 7-9) UAV 5 may autonomously fly to the ground power charging mat/docking station 60. UAV 5 may position itself and the pod onto dock 60 or induction charging mat 60. In various embodiments, there may be provided an autonomous release capability for the pod locking/release mechanism from the charging dock 60. After release from the dock, the UAV may hover under its own internal power and flight controls to the next charged pod, descend vertically and mate with the mission ready and charged POD. The next charged pod may be immediately next to the previous pod, or in a location relatively adjacent to the previous pod, or at a remote location from the previous pod. At a home base, the returning empty pod (e.g., the cargo bay is empty) may be recharged and its payload may be replenished in preparation for the next mission.

At the remote docking station 60 located near the customer, the pods may be recharged by the docking station and may be available to mate with a UAV once the customer has retrieved their cargo/payload and the pod has sufficient internal power to assist the UAV (the mass of the pod plus UAV) to return to base. This may be based on a known calculation or calculated based on specifications of the pod, UAV, and each of their battery capacities. In another embodiment, calculations may be made for a full pod, or partial load in the pod, when a customer is returning items to the base.

An increase in the range both to and from a central location may be realized by the UAV when operated in concert with a detachable pod with supplemental power and a recharging/docking station. The process permits a UAV to attach to a pod docked on a ground charging pad/oower docking station and take off on a mission specific to the cargo pod's payload. The entire pod and UAV then operates as one single, seamless UAV system and departs to complete it mission. Upon completion of the UAV's mission the UAV returns to the ground charging pad/power docking station for landing. The UAV then lands, detaches the used pod for re-charging and reloading. When a supplemental power battery is unavailable (either no pods are located nearby, or the nearby pods are not charged with adequate power), the UAV may recharge at one or more of the docking stations 60, including the one with the pod being dropped off, or docking stations 60 located on the way to the central location 20. However, this may slow the process of delivering pods with the particular UAV, but will allow UAV 5 to "limp" back when supplemental power is unavailable from nearby pods 10.

The pod may use a docking station to allow it to land where its cargo/payload can be added or removed. The docking station may also secure/lock the pod so it may not be stolen by 'porch pirates' or thieves in general. The docking station at the main base of operations may house multiple pods. Smaller docking stations may be used in a manner similar to mailboxes at businesses and residences. In various embodiments, the UAV system (pod plus UAV) may fly from the main base of operations to a commercial or residential docking station/electronic mailbox. Upon arrival the pod is landed and separates from the UAV. The UAV may return to a base under its own power. The maximum range of the UAV is no longer dictated by the UAV's onboard power supply as it is now able to fly to a closer docked pod, mate with that pod and depart for home base. Any pod resting on a docking station has its power supply recharged by the docking station and is then able to supplement the power of any UAV returning to base.

The UAV then flies to the next waiting pod under its own internal power, connects to the pod and departs for its next mission as a combined pod and UAV. Supplementary power is supplied by the pod to the UAV. All flight controls, propulsion, navigation and flight dynamics are controlled by the UAV. The pod may carry payload, supplies, and supplemental power for the UAV.

With a pod that may supply power to the UAV, the UAS (i.e., the combination of the pod and UAV) may complete more missions per UAV airframe and avoid down-time when recharging the UAS/UAV or reloading it with whatever mission payload it requires. An aerial system (a set of pods and a set of UAVs) may be designed for a particular mission. As an example, a firefighting UAS may need a higher payload capability, but may operate over a shorter range and speed than an aerial system used to extract a wounded soldier from a remote battlefield location, which might need more range and speed, so the UAV aerial system might differ for implementation. In these two different endeavors, the pod may remain the same size, supply the same supplemental power to a UAV, and have the same dimensions, while the UAV is chosen to carry out the specific range and speed characteristics.

In various embodiments, the system may include an internally powered, rapidly reconfigurable, pod with an aerodynamically designed external shaped lifting body. The pod may also reduce drag and generate lift by utilizing an aerodynamic design know as a 'lifting-body'. The pod may carry a variety of mission specific cargo and may come in several standard sizes. Examples of pod payload would include water for aerial fighter fighting, munitions for aerial resupply of ground forces, navy stores for at sea replenishment, search and rescue victims, remote sensing equipment, such as Infra-red cameras, food and other commercial goods delivery and medivac of military and/or civilian personal in warlike situations.

A pod may be designed and operated to rapidly attach/detach to a UAV. This permits a UAV to attach to pod docked on a ground charging pad/power docking station and take off on a mission specific to the cargo pod's payload. The entire pod-UAV system operates as one single UAV system and departs to complete it mission. Upon completion of the UAV's mission the UAV returns to the ground charging pad/power docking station for landing. The UAV then lands, detaches the used cargo orb/pod for re-charging and reloading. The UAV, without the pod, then flies to the next waiting pod under its own internal power, connects to that waiting pod and departs for its next mission as a combined pod/UAV. Supplementary power may be supplied by the pod to the UAV. All flight controls, propulsion, navigation, and flight dynamics are controlled by the UAV, the pod may be configured to only carry payload, supplies, and supplemental power to the UAV, and to generate supplemental lift through its lifting body design.

Figure 11:
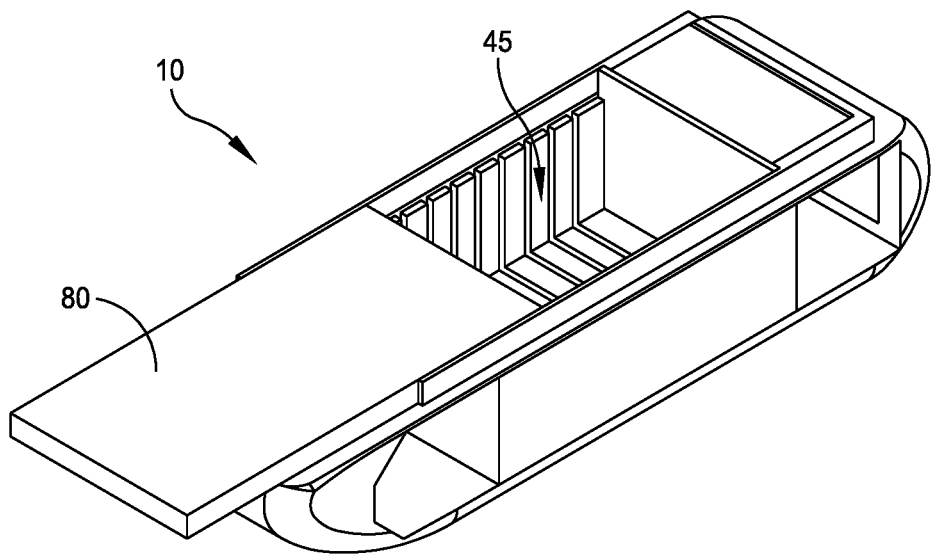
FIGS. 11 and 12 illustrate a pod with an access door as well as a divider to optimize cargo capacity.
Figure 12:
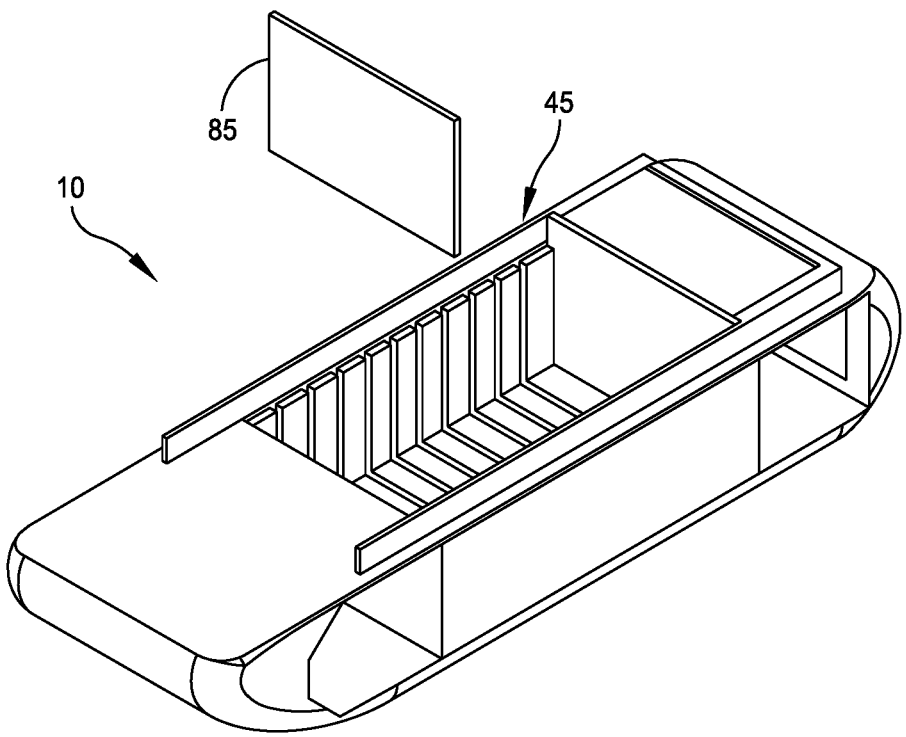

Various embodiments may include, but are not limited to, standardized design features selected from one or more of standardized attachment points, standardized power supply, standardized power attachment points to power the aerial system, standardized ground recharging dock, which could include an induction charging system, standardized lifting body designed to reduced drag for the specific flight speed targeted, standardized moveable internal compartments (see FIGS. 11 and 12) which may utilize a cargo door 80 and one or more cargo dividers 85 to assist in rapidly reconfiguring the internal payload. Cargo door 80 or multiple doors may provide access to the cargo area. The cargo door 80 may be configured in the top portion, the sidewall, or the bottom portion of pod 10. The cargo bay 45 may be configured to carry various items, including water for aerial firefighting.

In various embodiments, the pod's aerodynamic lifting-body shape would be designed to cover a variety of flight conditions for a given mission. This could include low-subsonic flight (0-150 kts) up to supersonic speeds.

The UAS may be employed in solo aircraft missions, such as delivery of stores and munitions to warships and commercial ships at sea, or recovering wounded soldiers in combat. The UAS may also be utilized in swarm missions where hundreds of UASs could be used to fight forest fires.

Once the entire aerial system (UAS with pod and UAV) returns from its mission, the pod land on its docking station and be released for re-charging. The UAS may fly on its own reduced internal power to a next pod, and that pod may be charged and loaded for the mission.

For some missions, the UAS and PODs may work as a swarm with multiple systems flying in formation to effect their mission, such as swarm flight fighting of forest fires.

The pod system design may be optimized for stackable transportation and stackable storage to allow for rapid field deployment. The charging system may use a large roll-out design, similar to a carpet roll, so as to charge several pods from a basic generator or grid power source. In an embodiment, additional area could be covered by connecting several strands of docking rolls.

In various embodiment, an upper surface design of the pod may be designed to help the aerial system dock the UAV to the pod as the UAV lowers itself onto the pod from above.

In various embodiments, the pod may be configured to recharge from the docking station and subsequently provide the main source of power to the aerial system. The aerial system may be optimized to carry a relatively small power source to enable movement from one pod to the next by autonomous flight on its smaller internal power source.

In at least one embodiment, the pod may be capable of induction charging or utilize a docking system to recharge between missions.

The pod may include various components to allow for rapid internal reconfiguration. One example may be moving internal panels (FIG. 12, cargo dividers 85) to limit the amount of water carried by the pod based on flight distances required on a given mission. This could also be achieved with a drop-in system to change the internal mission configuration to carry a wounded soldier, stores and ammunition or sensors. The pod external dimensions, aerodynamic shape, attachment points and overall physical dimensions may be set to not change.

One operational deployment example includes aerial firefighting in a swarm. A recharging banner is rolled out along a road and connected to power source. Pods are placed on recharging stations. Pod internal panels are configured to correct amount of water tank required for mission. Pods are charged and tanks filled with water. Aerial System flies on internal power to dock with pods. Pods and aerial system dock and the pod supplemental power now supplies flight power to aerial system. Pods may depart in swarm as directed by aerial systems flight control system to conduct mission. The UAS returns from mission, lands the pod on a recharging station, then releases the pod, and maneuvers under internal power to next POD which is charged and loaded with water.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A system for enhanced aerial delivery capability, the system comprising:

a UAV having a primary battery to provide power to one or more electrical motors for powered flight;

a pod having a cargo portion to selectively carry a payload, the pod having a supplemental battery to selectively supply power to the UAV; and an autonomous mounting system configured to provide selective and autonomous mechanical connection of the pod with the UAV, the mounting system configured to provide selective and autonomous electrical connection of the supplemental battery of the pod to the UAV so as to selectively power the one or more electrical motors of the UAV with the stored electrical power from the supplemental battery when the mounting system mechanically and electrically connects the UAV and the pod to one another; and an autonomous docking system having a docking station and a pod locking/release mechanism, the docking station configured to provide selective and autonomous mechanical connection of the pod with the pod locking/release mechanism, and the autonomous docking system configured to provide selective and autonomous electrical connection to the supplemental battery of the pod, and the pod locking/release mechanism configured to selectively and autonomously secure the pod to the autonomous docking system so as to prevent removal of the pod by an unauthorized party.

2. A system in accordance with claim 1, wherein the supplemental battery of the pod is configured to provide power to the primary battery of the UAV.

3. A system in accordance with claim 1, wherein the supplemental battery of the pod is configured to provide power directly to the one or more electrical motors.

4. A system in accordance with claim 1, wherein the selective and autonomous electrical connection of the pod provides electrical power to the supplemental battery during an absence of the UAV.

5. A system in accordance with claim 1, wherein the docking station includes a battery status monitor in electrical connection with the supplemental battery.

6. A system in accordance with claim 1, wherein the UAV is provided from a plurality of UAVs provide the UAV, the pod is provided from a plurality of pods, and a selected one from the plurality of UAVs is configured to autonomously mount to a selected one from the plurality of pods.

7. A system in accordance with claim 6, wherein the selected one of the plurality of UAVs is configured to autonomously decouple from the selected one of the plurality of pods.

8. A system in accordance with claim 7, wherein the selected one of the plurality of UAVs is configured to autonomously mount to a different selected one from the plurality of pods so as to swap the UAV from the selected one of the plurality of pods to the different selected one from the plurality of pods.

9. A system in accordance with claim 1, wherein the pod includes a battery status monitor in electrical connection with the supplemental battery, and the battery status monitor configured to broadcast information related to the supplemental battery to a base station.

10. A system in accordance with claim 1, wherein the pod includes a location status monitor to determine location thereof, and the location status monitor configured to broadcast information related to the location of the pod to a base station.

11. A system in accordance with claim 1, wherein the pod includes a cargo monitor to determine status of the payload in the cargo portion, and the cargo monitor configured to broadcast information related to the status of the payload in the cargo portion to a base station.

12. A method of powering a UAV for enhanced aerial delivery capability, the method comprising:
providing a UAV having a primary battery to provide power to one or more electrical motors for powered flight;
providing a pod having a cargo portion to selectively carry a payload, the pod having a supplemental battery to selectively supply power to the UAV; and
providing an autonomous mounting system configured to provide selective and autonomous mechanical connection of the pod with the UAV, the mounting system configured to provide selective and autonomous electrical connection of the supplemental battery of the pod to the UAV so as to selectively power the one or more electrical motors of the UAV with the stored electrical power from the supplemental battery when the mounting system mechanically and electrically connects the UAV and the pod to one another;
providing an autonomous docking system having a docking station and a pod locking/release mechanism, the docking station configured to provide selective and autonomous mechanical connection of the pod with the pod locking/release mechanism, and the autonomous docking system configured to provide selective and autonomous electrical connection to the supplemental battery of the pod, and the pod locking/release mechanism configured to selectively and autonomously secure the pod to the autonomous docking system so as to prevent removal of the pod by an unauthorized party;
autonomously mounting the UAV to a selected one from a plurality of pods;
flying the UAV from a first location to a second location using power supplied from the supplemental battery to the UAV, wherein the supplemental battery provides an enhanced range of flight for the UAV in addition to the primary battery; and
selectively and autonomously securing the pod to the autonomous docking system so as to prevent removal of the pod by an unauthorized party.

13. The method in accordance with claim 12, further comprising autonomously decoupling the selected one from the plurality of pods from the UAV, and flying the UAV from the second location using the primary battery.

14. The method in accordance with claim 13, further comprising autonomously mounting the UAV to another pod selected from the plurality of pods, wherein the UAV is swapped from the selected one of the plurality of pods to the another selected one from the plurality of pods, and further comprising flying the UAV using the supplemental battery of the another pod, wherein the supplemental battery of the another pod provides an enhanced range of flight for the UAV in addition to the primary battery.

* * * * *